US010677225B2

(12) United States Patent
Caponetti et al.

(10) Patent No.: US 10,677,225 B2
(45) Date of Patent: Jun. 9, 2020

(54) METHOD OF CALIBRATING LOAD SENSORS OF A WIND TURBINE

(71) Applicant: VESTAS WIND SYSTEMS A/S, Aarhus N (DK)

(72) Inventors: Fabio Caponetti, Aarhus C (DK); Kasper Zinck Ostergaard, Flemming (DK); Dan Hilton, Gjern (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 160 days.

(21) Appl. No.: 15/580,001

(22) PCT Filed: Jun. 17, 2016

(86) PCT No.: PCT/DK2016/050198
§ 371 (c)(1),
(2) Date: Dec. 6, 2017

(87) PCT Pub. No.: WO2017/000948
PCT Pub. Date: Jan. 5, 2017

(65) Prior Publication Data
US 2018/0135601 A1   May 17, 2018

(30) Foreign Application Priority Data

Jun. 30, 2015 (DK) ................... 2015 70410

(51) Int. Cl.
*F03D 17/00* (2016.01)
*F03D 13/35* (2016.01)
*F03D 7/02* (2006.01)
*G05B 19/042* (2006.01)

(52) U.S. Cl.
CPC .......... *F03D 17/00* (2016.05); *F03D 7/0224* (2013.01); *F03D 13/35* (2016.05); *G05B 19/042* (2013.01);
(Continued)

(58) Field of Classification Search
CPC ........ F03D 13/35; F03D 17/00; F03D 7/0224; F05B 2240/221; F05B 2270/101;
(Continued)

(56) References Cited

U.S. PATENT DOCUMENTS

2009/0263246 A1   10/2009   Bolz
2011/0142593 A1*   6/2011   Hoffmann ............. F03D 7/0296
                                                                                  415/1
(Continued)

FOREIGN PATENT DOCUMENTS

CN   101495747 A   7/2009
CN   102338034 A   2/2012
(Continued)

OTHER PUBLICATIONS

Danish Search Report for Application No. PA 2015 70410 dated Feb. 3, 2016.
(Continued)

*Primary Examiner* — Yuhui R Pan
(74) *Attorney, Agent, or Firm* — Patterson + Sheridan, LLP

(57) ABSTRACT

A method of calibrating load sensors of a wind turbine, and a wind turbine for such load sensor calibration, are disclosed. The wind turbine comprises a rotor, a plurality of rotor blades, and a plurality of load sensors associated with the rotor blades. While the rotor is rotating, at least one of the rotor blades is moved from a first calibration position to a second calibration position, and load values from the load sensors are measured. The number of rotor blades being moved is at least one fewer than the number of the plurality of rotor blades. The rotation of the rotor may be during idling of the wind turbine. The movement of the blade(s) may be to change the pitch angle of the blade(s). At least one of the rotor blades not being moved to a calibration position (Continued)

may also be moved, for example to control the rotational speed of the rotor.

20 Claims, 6 Drawing Sheets

(52) U.S. Cl.
CPC ... *F05B 2240/221* (2013.01); *F05B 2270/101* (2013.01); *F05B 2270/802* (2013.01); *G05B 2219/2619* (2013.01); *Y02E 10/72* (2013.01)

(58) Field of Classification Search
CPC ............ F05B 2270/802; G05B 19/042; G05B 2219/2619; Y02E 10/72
See application file for complete search history.

(56) References Cited

U.S. PATENT DOCUMENTS

| | | | | |
|---|---|---|---|---|
| 2013/0183151 | A1* | 7/2013 | Garate Lvaro | F03D 17/00 416/1 |
| 2014/0003936 | A1* | 1/2014 | Agarwal | F03D 7/02 416/1 |
| 2015/0086362 | A1* | 3/2015 | Fu | F03D 7/024 416/1 |

FOREIGN PATENT DOCUMENTS

| | | |
|---|---|---|
| EP | 1359321 A1 | 11/2003 |
| EP | 2354538 A1 | 8/2011 |
| EP | 2615303 A1 | 7/2013 |
| GB | 2459726 A | 11/2009 |
| WO | 2010016764 A1 | 2/2010 |
| WO | 2012000505 A2 | 1/2012 |
| WO | 2017000948 A1 | 1/2017 |

OTHER PUBLICATIONS

International Search Report for Application No. PCT/DK2016/050198 dated Sep. 16, 2016.
Chinese Office Action for Application No. 201680038744.X dated 2018. Nov. 2018.

* cited by examiner

METHOD OF CALIBRATING LOAD SENSORS OF A WIND TURBINE

FIELD OF THE INVENTION

This invention is directed to methods of calibrating load sensors of a wind turbine, and a wind turbine for such load sensor calibration.

BACKGROUND OF THE INVENTION

Loading on the components of wind turbines is carefully controlled, in order to maximise efficiency, and to minimise wear and damage. Load sensors are commonly mounted on wind turbines, typically on the rotor blades. These sensors require calibration in order to convert the values measured by these sensors to the actual loads on the turbine components.

One previously considered method for calibrating these sensors is a calibration procedure in which the rotor is turned while the blades are at a fixed pitch angle. Other previous methods fix the rotor, so that it is immobile while measurements relating to the blade load sensors are taken, for example while one blade is horizontal. Such approaches may not be sufficient to provide the data needed for more sophisticated models of the forces and moments acting on the blades. Such more sophisticated models may be required in order to avoid large inaccuracies in load estimation, which may lead to unsatisfactory wear or damage mitigation. It may also be practically challenging to stop the rotor at a specific position with exacting precision. In other previous methods, less sophisticated models are used for load calculations and calibration, such as neglecting the axial loads due to centrifugal effects and/or neglecting the influence of forces not along the measurement axis.

In some previous methods, the influence of axial loads can be, in ideal cases, addressed by using a differential sensor setup, in which two sensors are placed on opposite sides of the blade. These methods may not be sufficiently accurate where the sensors cannot reliably be placed exactly in alignment across the blade due to installation tolerance or due to the structural design of the blade. Less sophisticated models are further inadequate when three or more sensors per blade are used.

Another previous method rotates the rotor while other components of the turbine are also moved. However, in such methods, the testing procedure and/or movements must be heavily limited in order to prevent either stalling of the rotor, which requires a test re-start, or excessive speed of the rotor, which can damage turbine components. In addition, such methods are typically unable to test using a full range of movement of a turbine component without either stalling, producing excessive speed, or damaging the component or turbine.

In another previous method, a more sophisticated model for loading is used, but measurements are only taken during normal running of the turbine. This may not allow for full testing of all possible loading situations, and in any case again cannot test the full range of movement, for similar reasons as for the testing procedure above. Moreover, in normal running of the turbine all blades are operated at once.

The present invention aims to address these problems and provide improvements upon the known devices and methods.

STATEMENT OF INVENTION

Aspects and embodiments of the invention are set out in the accompanying claims.

In general terms, one embodiment of a first aspect of the invention can provide a method of calibrating load sensors of a wind turbine, the wind turbine comprising a rotor, a plurality of rotor blades, and a plurality of load sensors associated with the rotor blades, the method comprising, while the rotor is rotating: moving at least one of the rotor blades from a first calibration position to a second calibration position, wherein the number of said at least one rotor blades being moved is at least one fewer than the number of said plurality of rotor blades; and measuring load values from the load sensors.

Since not all of the blades are being moved to calibration positions, the movement of these (fewer than all) blades contributes less to the aerodynamic effects on the rotor, and therefore the rotor can be rotated more consistently and safely, whilst still obtaining full calibration movement of the blade(s).

The turbine may for example have three rotor blades. The number of blades being moved, changed, varied or altered (in position) or manoeuvred, may only be one of the blades. The sensors associated with the blades may be a common number for each blade, such as one or more each. The sensors may be disposed at a root of the blade, to measure the blade loads. They may also or alternatively be disposed along the length of the rotor blade.

Suitably, the rotation or turning of the rotor is during idling of the wind turbine. For example, a specific calibration procedure may be used, for example in which normal running of the turbine is stopped, and an idle state of the turbine is entered, in which testing can be undertaken.

In embodiments, the step of moving comprises changing the pitch angle of the at least one rotor blade from a first pitch angle to a second pitch angle. Optionally, the step of moving comprises moving the at least one rotor blade through a series of calibration positions. For example, the movement or pitching of the blade may be through a series of steps of different positions or angles of the blade.

In another embodiment, the first calibration position is a maximum calibration position for the rotor blade, the second calibration position is a minimum calibration position for the rotor blade, and the step of moving comprises moving the at least one rotor blade continuously between the maximum and minimum calibration positions. In this manner, a sweep through the positions can be undertaken. In the case of pitching the blade, this can be achieved by a pitch sweep through the possible pitch angles of the blade.

Suitably, the method further comprises moving at least one of the rotor blades not being moved to a calibration position, to a control position.

Therefore, rather than maintaining a position (from the start or previous stage of the test, or from an idle position), a blade which is not being moved for calibration can be activated or moved to benefit or improve the testing procedure. More than one blade (not being moved for calibration) can be moved in this way, and in collaboration where required. For example, in a three-blade turbine in which one blade is moved for calibration, the other two blades can be moved, together, differently or separately.

Suitably, the step of moving the at least one rotor blade to a control position comprises moving the control rotor blade to control the rotational speed of the rotor. Thus the spare or control blade or blades can be moved to ensure that the rotor maintains a certain speed, or does not exceed a maximum or minimum speed. These may ensure that the rotor keeps moving during a test, or that it does not exceed a damaging speed or a speed that would affect the data significantly. For example, the blade(s) not currently being moved for calibration can be moved to a pitch angle which increases the rotational idling speed of the rotor.

In an embodiment, the method comprises: initially moving all of the plurality of rotor blades to control the rotational speed of the rotor; and subsequently moving the at least one rotor blade from the first calibration position to the second calibration position, whilst moving the at least one rotor blade to control the rotational speed of the rotor.

Similarly, on completion of a testing procedure on a first blade, all blades may again be engaged to control the rotational speed, for example to prevent stalling, stopping or overspeeding, before another blade is selected for calibration.

In embodiments, the at least one rotor blade, being moved from the first calibration position to the second calibration position, has at least one associated load sensor, and the method further comprises: for the at least one load sensor (or, in the case of a plurality of sensors, each of the plurality of load sensors), using the measured load value from the load sensor to determine axial, flap moment and edge moment components of the load. In other embodiments, the measured load value from the load sensor may be used to determine other (or other combinations of) forces and moments of the load.

In embodiments, the method comprises using data from the load sensor (or, in the case of a plurality of load sensors, from all load sensors) to calculate a load estimate, or a combination of the load components, for the at least one rotor blade. In embodiments, the at least one rotor blade has a plurality of associated load sensors, for example three or four.

This allows a more sophisticated modelling calculation, in which load components from the axial, flap moment and edge moment loads from each sensor are considered, rather than these loads being cancelled out by pairing of sensors, which may be inaccurate. Moreover, the data from all three or more sensors is used in the calculation, so that, for example, a complex model with at least three unknowns can be solved using the values obtained.

One embodiment of a second aspect of the invention can provide a method of calibrating load sensors of a wind turbine, the wind turbine comprising a rotor, a plurality of rotor blades, and at least three load sensors associated with each rotor blade, the method comprising, while the rotor is rotating: moving at least one of the rotor blades from a first calibration position to a second calibration position; measuring load values from the load sensors; for each of the at least three load sensors associated with the at least one rotor blade, using the measured load value to determine axial, flap moment and edge moment components of the load; and using data from all at least three load sensors to calculate a load estimate for the at least one rotor blade.

One embodiment of a third aspect of the invention can provide a computer program, or a computer readable medium comprising computer program code, adapted, when loaded into or run on a computer or processor, to cause the computer or processor to carry out steps of a method as described above.

One embodiment of a fourth aspect of the invention can provide a wind turbine comprising: a rotor; a plurality of rotor blades; a plurality of loads sensors associated with the rotor blades; and a controller configured to control the wind turbine to, while the rotor is rotating: move at least one of the rotor blades from a first calibration position to a second calibration position, wherein the number of said at least one rotor blades being moved is at least one fewer than the number of said plurality of rotor blades; and measure load values from the load sensors.

The above aspects and embodiments may be combined to provide further aspects and embodiments of the invention.

BRIEF DESCRIPTION OF THE DRAWINGS

The invention will now be described by way of example with reference to the accompanying drawings, in which.

DETAILED DESCRIPTION OF EMBODIMENTS

Embodiments of the invention provide improved methods for calibrating load sensors in wind turbines, particularly by a scheme of movement of the rotor blades, and by using more of the data from the load sensors to inform a more sophisticated model of the loads.

Figure 1:
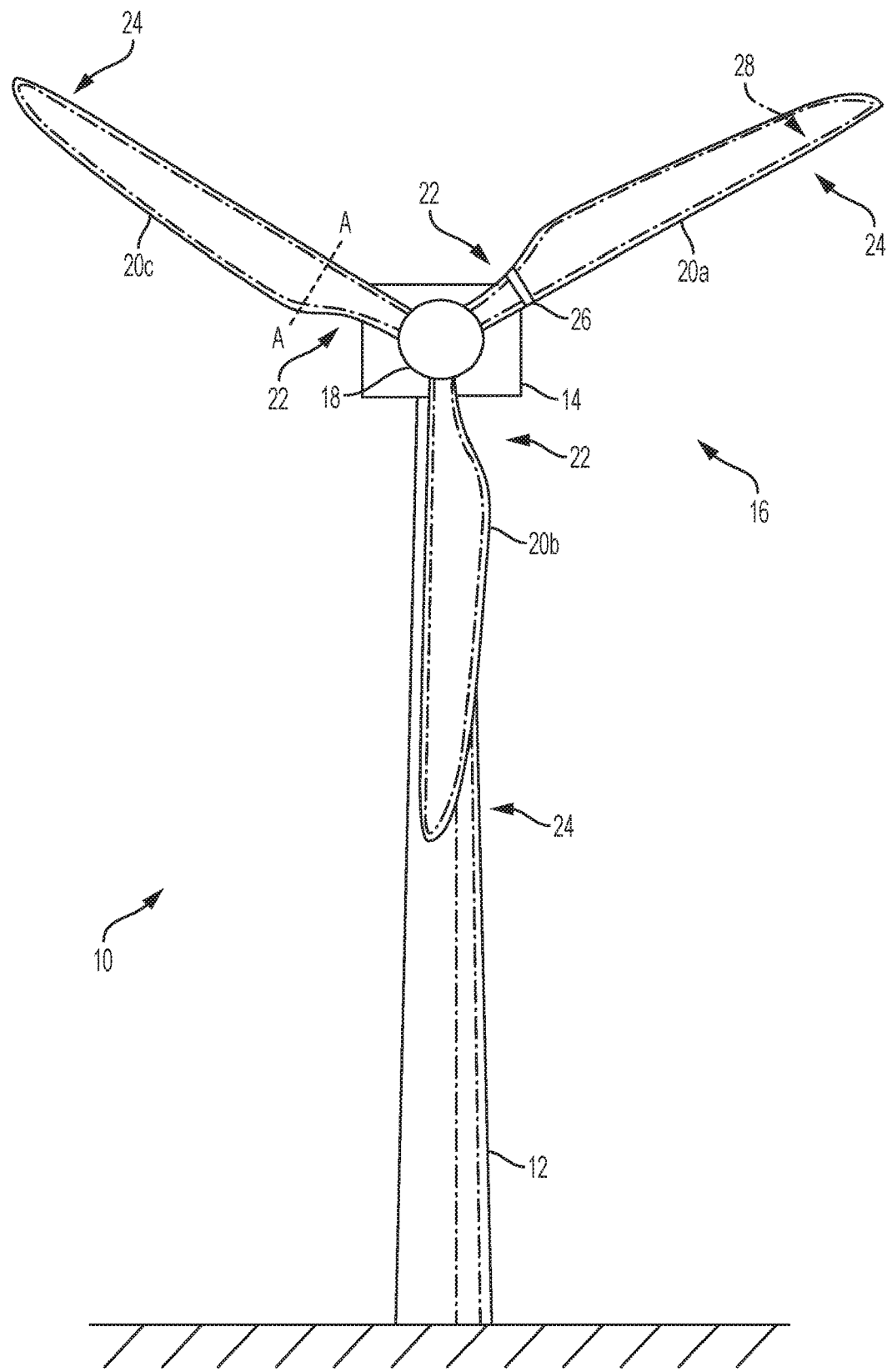
FIG. 1 is a schematic view of a wind turbine according to an embodiment of the present invention.

FIG. 1 is a schematic view of a wind turbine according to an embodiment of the present invention. A wind turbine 10 comprises a tower 12 on which a nacelle 14 is supported. A rotor 16 is mounted to the front of the nacelle 14. The rotor 16 comprises a hub 18 on which three equally-spaced rotor blades 20a, 20b, 20c are mounted. The rotor 16 includes a blade pitch system capable of varying the pitch angle of each rotor blade 20a, 20b, 20c independently, for example using an electric or hydraulic blade pitch drive.

In this embodiment, the rotor blades 20a, 20b, 20c each have a substantially cylindrical cross section at their root end 22. The cross section smoothly transitions to an aerofoil profile at a maximum chord position as indicated by the line A-A. The chord then progressively decreases towards the tip 24 of the rotor blades 20a, 20b, 20c. The rotor blades 20a, 20b, 20c also steadily taper in thickness along their length moving from the root 22 towards the tip 24. Other blade profiles are of course possible for use with the inventive calibration techniques described herein.

A load sensing system 26 is located near a root end 22 of the rotor blade 20a. The load sensing system 26 comprises at least one load sensor—in some embodiments, more than one sensor may be provided, spaced circumferentially around the blade root.

Here, the load sensor is mounted on an inner surface of a rotor blade shell to protect it from the environment. In other embodiments, the load sensor may be mounted on the outer surface of the shell or embedded within the shell.

The load sensor is configured to measure the mechanical deformation of the root end of the blade. Typically this is achieved using some sort of strain gauge. In this embodiment, the load sensor is an optical strain gauge, of a type known to the art. As wind turbines are very tall structures, they are susceptible to lightning strikes that may cause damage to the wind turbine 10. The use of optical load sensors eliminates metallic or electrically conductive components in exposed parts of the rotor, thereby reducing the vulnerability of the rotor blade 20a to lightning strikes.

In alternative embodiments, the load sensor(s) may be mounted in a different position on the rotor blade away from the root, for example along the length of the blade. The position is typically chosen to measure the mechanical deformation at that part of the blade. Sensors may of course be mounted in both, or more, positions.

An optoelectronic suite (not shown) is located remote from the rotor blade 20a, for example in the nacelle 14 or the hub 18 of the wind turbine 10. The optoelectronic suite and the blade pitching system of the wind turbine are connected to a controller (not shown). The load sensor is connected with the optoelectronic suite by optical fibres as is conventional in the art. The optoelectronic suite further comprises a light source and a light detector connected to the load sensor. In embodiments with more than one load sensor, the light source is connected to the first load sensor in the series, and the light detector connected to the last load sensor in the series.

The controller includes a memory on which control software is stored, and a processor to run the control software. The control software governs the operation of the load sensor and blade pitching system. As will be described in more detail below, the control software controls, while the rotor is rotating, moving at least one of the rotor blades from a first calibration position to a second calibration position, and measuring load values from the load sensors.

Figure 2:
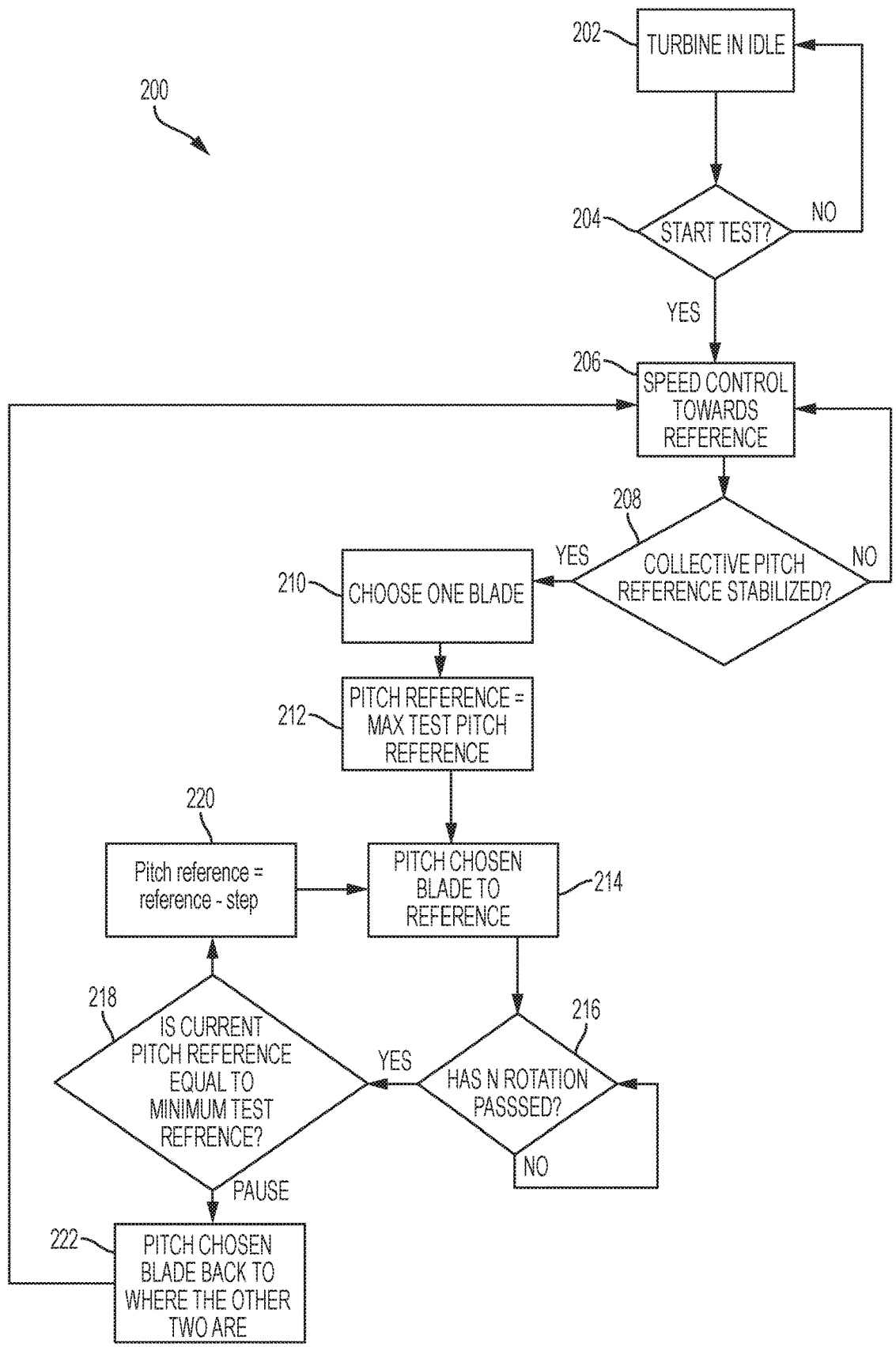
FIG. 2 is a flowchart illustrating steps of a method of calibrating load sensors of a wind turbine according to an embodiment of the invention.

FIG. 2 is a flowchart illustrating steps (200) of a method of calibrating load sensors of a wind turbine according to one embodiment of the invention.

The wind turbine is initially commanded to idle (202). Once into idle, manual mode is requested and the test is started (204). The operating point is characterized by there being no power production from the turbine. The blades are collectively pitched to the "idle" position, e.g. 78 degrees.

Data collection and calibration is commenced upon command. The latter might be automatically generated once idle is reached or manually activated from e.g. an operator panel or by remote application(s).

The test commences by operating the turbine so as to control the generator (or alternatively the rotor) speed to a pre-defined reference level (206). The reference might be chosen as function of the measured wind speed (e.g. from a look up table) or be a constant parameter. As results, the blades are pitched collectively in closed loop, so that the incident wind speed provides sufficient rotor speed to reach the desired speed reference.

Once the speed is reached, the collective pitch reference is expected to stabilize (208) around a steady value. Blades positions are claimed to be "stabilized" when the collective pitch reference used for speed control is not changing anymore.

One blade is now chosen (210). This blade is pitched towards the maximum pitch reference (212) set for test, generally close or equal to 90 degrees. When the pitch reference is reached (214), the system waits for the rotor to perform a pre-defined number of rotations (216). The number of rotations might be a function of the pitch angle and might be either an integer number or fraction of full rotations.

If the current pitch reference is not equal to the minimum pitch reference for test (218), then the pitch reference is reduced by a step size (220), and the procedure is repeated. The blade is pitched to reference (214), rotor rotations are waited to pass (216), and the check of minimal pitch is repeated (218). The number of steps, the ramp rate and the min/max pitch reference are tuneable. In an alternative, the pitch change is continuous, with measurements continuing throughout the pitch range, rather than the pitch being altered in steps.

When the minimum pitch reference for test is reached (218), the system again waits (noted as "Pause" in FIG. 2) for the rotor to perform a pre-defined number of rotations. Again, the number of rotations might be a function of the pitch angle and might be either an integer number or fraction of full rotations. The test for the current blade is then completed; hence the blade is pitched back to where it was when the test commenced (222). At this point speed control (206) is enabled again, and test is started for another blade. Speed control is necessary again, as the wind speed might have changed and/or the rotor (or generator) speed might have changed during the test as result of the one blade individual pitch motion commanded by the test. Therefore the pitches of the blades are collectively controlled again to manage the speed of the rotor to a satisfactory level before stabilizing (208), and selecting the next blade for testing (210).

Figure 3:
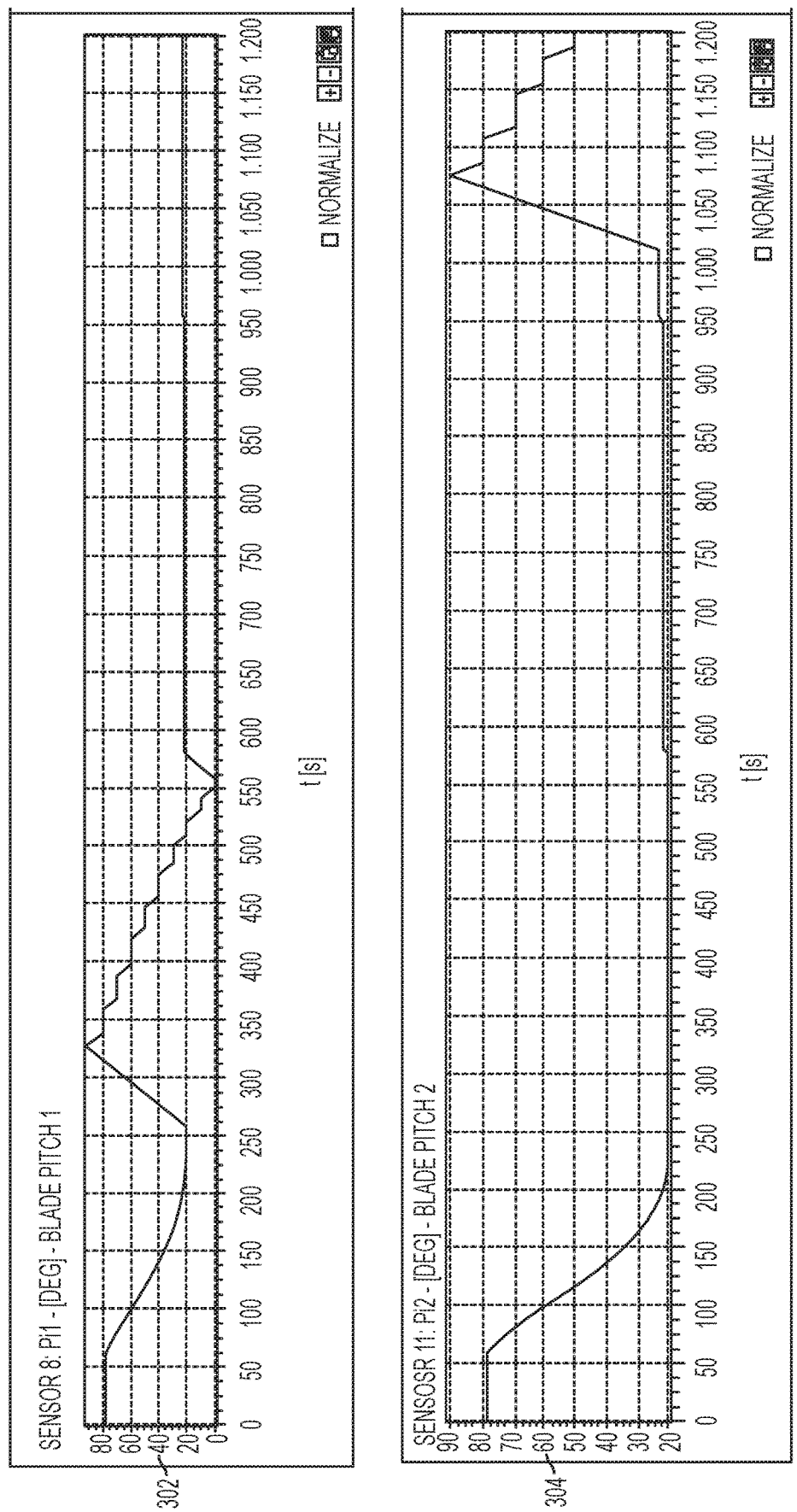
FIGS. 3 to 5 are graphs showing parameters measured during operation of a method of calibration according to embodiments of the invention.
Figure 3:
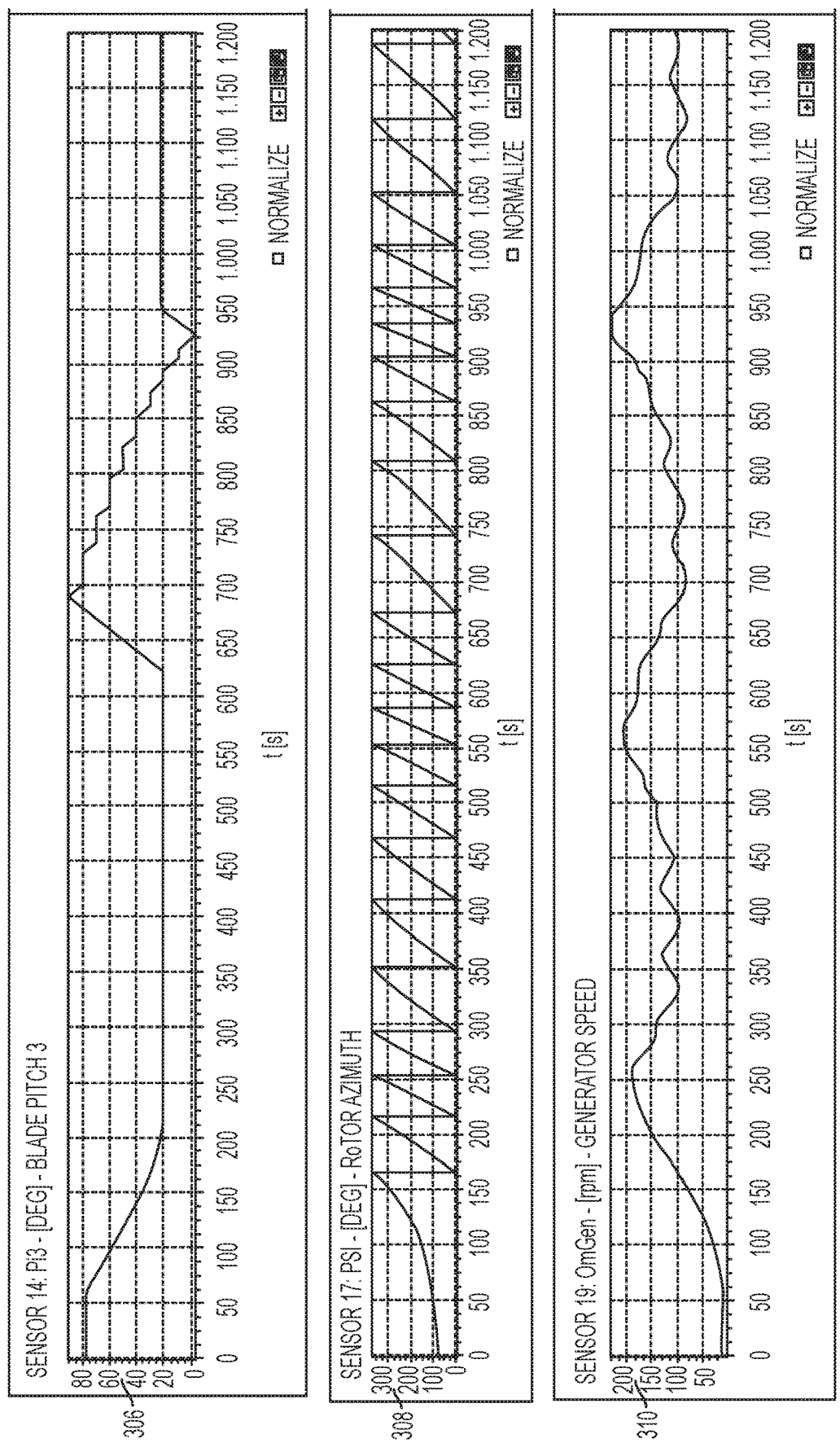

FIG. 3 is a graph showing parameters measured during operation of this method of calibration according to an embodiment of the invention. The graphs 302, 304 and 306 indicate the pitch positions for the three blades of the turbine, whilst the graph 308 indicates the rotor position or azimuth, and the graph 310 indicates the rotor speed.

As can be seen from the first period of the graphs 302, 304 and 306, the blades are collectively pitched to around 30 degrees to reach the desired speed set-point, as shown in the speed graph 310. Once the speed is at a satisfactory point, i.e. the pitching of the first test blade to its maximum angle (producing minimum rotor speed for that blade) will not cause the rotor to stall (i.e. the minimum speed achieved by means of the remaining two blades' maintained pitch angles will be greater than zero), testing can start. Blade A (302) is then pitched towards 90 degrees and the descending staircase of steps to references between 90 degrees and the minimum is commenced. For each stair half a rotation (as can be seen on the rotation tracking graph 308) is waited to pass before descending to the next step. Once 0 degrees is reached for blade A and half a rotation is passed, the test for blade A is concluded and blade A is pitched back to around 30 degrees. Once the minimum speed is achieved again, the next blade, B, can follow the same process.

Once the data is collected for the range of pitch angles for all the blades during idle rotation, the data collected by each of the load sensors of the blades can be processed to find the calibration values. The data processing procedure determines the set of calibration values which map the measured displacement from the blade load sensor to blade flap bending moments. It shall be noted that data processing can happen at the same time with data collection or alternatively offline.

An example of the calculation of the loads, using the strain gauge sensor values, is described below.

Strain is a useful engineering measurement because it relates the forces acting on an object (e.g. gravity, centrifugal, bending, torsion) to physical movement that can be measured by a strain sensor (also known as a strain gauge). Definitions from the following table will be referred to here:

| Symbol | Definition |
|---|---|
| L | Length |
| $\varepsilon$ | Strain |
| K | Gain/Coefficient of proportionality |
| O | Offset |
| Sensor | Measured value from the sensor |
| $\alpha$ | Coefficient of Thermal expansion (CTE) |

| Symbol | Definition |
| --- | --- |
| T | Temperature |
| F | Force |
| M | Moment |
| A | Cross-sectional area of the blade |
| E | Young's modulus of the blade |
| I | Cross-sectional area of the blade |
| y | Distance from sensor to blade neutral axis |

By definition, strain ($\varepsilon$) is a normalized measure of the displacement of two points relative to a reference length. In other words, strain is the amount of deformation (expansion or compression) of a material relative to its original length and thus has no units.

$$\varepsilon = \frac{\Delta L}{L} = \frac{L_{New} - L_{Original}}{L_{Original}}$$

Depending on the type of strain sensor and its underlying technology, there will usually be a coefficient of proportionality (i.e. scaling factor) from sensor output to strain. There may also be an offset inherit to the sensor or due to the installation process. Thus, the generic model for a strain sensor is:

$$\varepsilon_{Measured} = K_{Sensor}\text{Sensor} + O_{Sensor}$$

A change in temperature will also cause thermal expansion/contraction of the sensor itself (in addition to the object being measured). This thermal strain will be proportional to the change in temperature by the coefficient of thermal expansion ($\alpha$).

$$\varepsilon_{Thermal} = \alpha_{Sensor}\Delta T = \alpha_{Sensor}(T_{Current} - T_{Reference})$$

Thus, the sensor will measure both the mechanical strain due to the applied loading and the thermal strain caused by temperature change.

$$\varepsilon_{Measured} = \varepsilon_{Mechanical} + \varepsilon_{Thermal}$$

$$K_{Sensor}\text{Sensor} + O_{Sensor} = \varepsilon_{Mechanical} + \alpha(T_{Current} - T_{Reference})$$

$$\varepsilon_{(Sensor)}^{Mechanical} = K_{Sensor}\text{Sensor} + O_{Sensor} - \alpha_{Sensor}(T_{Current} - T_{Reference})$$

The blade is subjected to forces caused by its own mass and by aerodynamics. Depending on the position of the blade, the rotor speed and the speed and direction of the wind, these forces combine to produce flap end edge bending moments and a total axial force. These loads cause strain in the blade (in addition to temperature change) can be represented generically by:

$$\varepsilon_{Blade} = \varepsilon_{Axial} + \varepsilon_{FlapBending} + \varepsilon_{EdgeBending} + \varepsilon_{Thermal}$$

The axial strain can be calculated by:

$$\varepsilon_{Axial} = \frac{F_{Axial}}{EA}$$

Both E and A depend on the blade design (plus production tolerances) and the measurement location. E and A can be grouped together and solved for during calibration. Thus, the axial strain can be represented generically by:

$$\varepsilon_{Axial} = K_{Axial}F_{Axial}$$

The bending strain (either flap or edge) can be calculated by:

$$\varepsilon_{Bending} = \frac{My}{EI}$$

Both E and I depend on the blade design (plus production tolerances). E, I and y all depend on the measurement location and can be grouped together and solved for during calibration. Thus, the bending strain can be represented generically by:

$$\varepsilon_{FlapBending} = K_{Flap}M_{Flap}$$

$$\varepsilon_{EdgeBending} = K_{Edge}M_{Edge}$$

The thermal strain caused by a change in temperature of the blade can be calculated by:

$$\varepsilon_{Thermal} = \alpha_{Blade}\Delta T = \alpha_{Blade}(T_{Current} - T_{Reference})$$

Combining all these equations for strain at a specific point in the blade yields the following generic model for the blade:

$$\varepsilon_{(Blade)}^{Mechanical} = K_{Axial}F_{Axial} + K_{Flap}M_{Flap} + K_{Edge}M_{Edge} + \alpha_{Blade}(T_{Current} - T_{Reference})$$

The unknown parameters in the models detailed above can be found by collecting data while the turbine is operating in a specified manner under certain weather conditions. Any calibration is only as good as the reference, the quality of the data and how well the system is modelled.

The blade loads estimator of embodiments of the invention has been developed to estimate the relevant forces and bending moments on the blades based in real time using turbine signals such as blade pitch, blade azimuth, rotor speed and wind speed. The estimated loads will be used as the calibration reference.

The axial force is well characterized by the estimator. Rotor speed and blade azimuth dictate the centripetal and gravitational forces which are the two primary axial forces. Wind speed and blade pitch have very little influence (practically negligible) on the axial force.

The flap and edge bending moments, on the other hand, are typically directly tied to blade pitch, blade azimuth and the wind speed. The bending moments caused by the mass of the blade itself (ignoring aerodynamic loads) can be characterized well by a non-aerodynamic model. This model works well during slow idle and with low wind speeds while the thrust on the blades is low. An aerodynamic loads estimator based on wind speed and power has also been incorporated to estimate the thrust on the blades allowing calibration at higher wind speeds and improving the overall fit of the model.

Using the models for the strain measured by the sensor and the strain from the loading on the blades, the complete equation during calibration for each sensor becomes:

$$\varepsilon_{Mechanical}^{(Sensor)} = \varepsilon_{Mechanical}^{(Blade)}$$

$$K_{Sensor}\text{Sensor} + O_{Sensor} - \alpha_{Combined}(T_{Current} - T_{Reference}) = K_{Axial}F_{Axial} + K_{Flap}M_{Flap} + K_{Edge}M_{Edge}$$

-continued
$$K_{Sensor}\text{Sensor} - \alpha_{Combined}(T_{Current} - T_{Reference}) =$$

$$[F_{Axial} \quad M_{Flap} \quad M_{Edge} \quad -1] \begin{bmatrix} K_{Axial} \\ K_{Flap} \\ K_{Edge} \\ O_{Sensor} \end{bmatrix}$$

The coefficient of thermal expansion used above is a combined term specific to the sensor type, the bonding to the blade and the location in the blade. The value can be calculated from material properties, but is ideally found through testing.

For each sensor, the unknown parameters on the right hand side of the equation can be solved for using algorithms taken from estimation theory, such as Ordinary Least Squares or Kalman Filtering. The axial force and flap and edge bending moments will come from the estimator.

To achieve the best numerical solution, the calibration data should adequately excite all of the individual strain components. In other words, the axial force and flap and edge bending moments must have dynamic content in order to have a valid solution. For example, if the blade is held in a fixed flapwise position, then the edge bending moment would be minimal and the resulting gain will be unreliable. Thus the blade should be positioned in both flapwise and edgewise positions for calibration.

This can be accomplished efficiently by performing a pitch sweep, as described herein, during slow idle. This will provide a varying axial force and flap and edge bending moments. The wind speed should be kept as low as possible and at least one full rotation of the rotor should be made to capture minimums and maximums.

Using this method entails that there is no need for values for axial components to be assumed or modelled in a basic way as in prior methods—the present method using movement (pitch sweep) of the blade while rotating provides all three components (axial, flap, edge) of data needed, from each individual sensor on the blade. There is also no need for a model using pairs of sensors arranged across blade axes in order to cancel out one component of the forces, as is common in the art.

During calibration, it is important that the blades are rotating. To prevent the rotor from stopping at very low wind speeds, a simple speed control can be implemented in which the rotor is brought up to an adequate starting speed before starting the pitch sequence. As noted above, this can be accomplished by pitching the three blades until the minimum speed is reached, then freezing the pitch of the two blades not being calibrated. During the pitch sequence, the rotor speed will drift due to pitching and varying wind speed. After one blade is calibrated, the blades are pitched again if necessary to re-establish the rotor speed and the cycle is repeated until all blades are calibrated. The calibration can be aborted if the rotor speed exceeds a safety threshold which could occur if the wind speed increases quickly during the pitch sequence.

Data processing according to one embodiment of the invention is split into macro steps.

1. Determine the estimated non-aerodynamic and aerodynamic loads acting on the blade as described above. Those are flap/edge bending moments and the axial force.

The employed model is based on simple physics laws, and thereby is a function of the measured blade azimuth position, pitch angle, rotor speed and of the geometrical properties of the rotor and nacelle such as blade mass distribution, blade centre of gravity and nacelle tilt angle, and blade/hub coning.

2. Knowing the position of the sensor in the blade, the estimated bending moments and axial force can be found for the exact sensor position.

3. Compensate the measured sensor reading for any temperature induced expansion/compression using the measured or estimated temperature at the sensor location.

$$\text{Strain}_{TempCompensated} = K_{Sensor}\text{Sensor}_{Measured} - \alpha_{Combined}(T_{Current} - T_{Reference})$$

where $K_{Sensor}$ is the coefficient of proportionality (i.e. scaling factor) to convert the sensor measurement to strain.

4. Find the blade load sensor calibration values $K_{Axial}$, $K_{Flap}$, $K_{Edge}$, $O_{Sensor}$ for the model:

$$\text{Strain}_{TempCompensated} = [F_{Axial} \quad M_{Flap} \quad M_{Edge} \quad -1] \begin{bmatrix} K_{Axial} \\ K_{Flap} \\ K_{Edge} \\ O_{Sensor} \end{bmatrix}$$

where $F_{Axial}$, $M_{Flap}$ and $M_{Edge}$ are the estimated loads.

Figure 4:
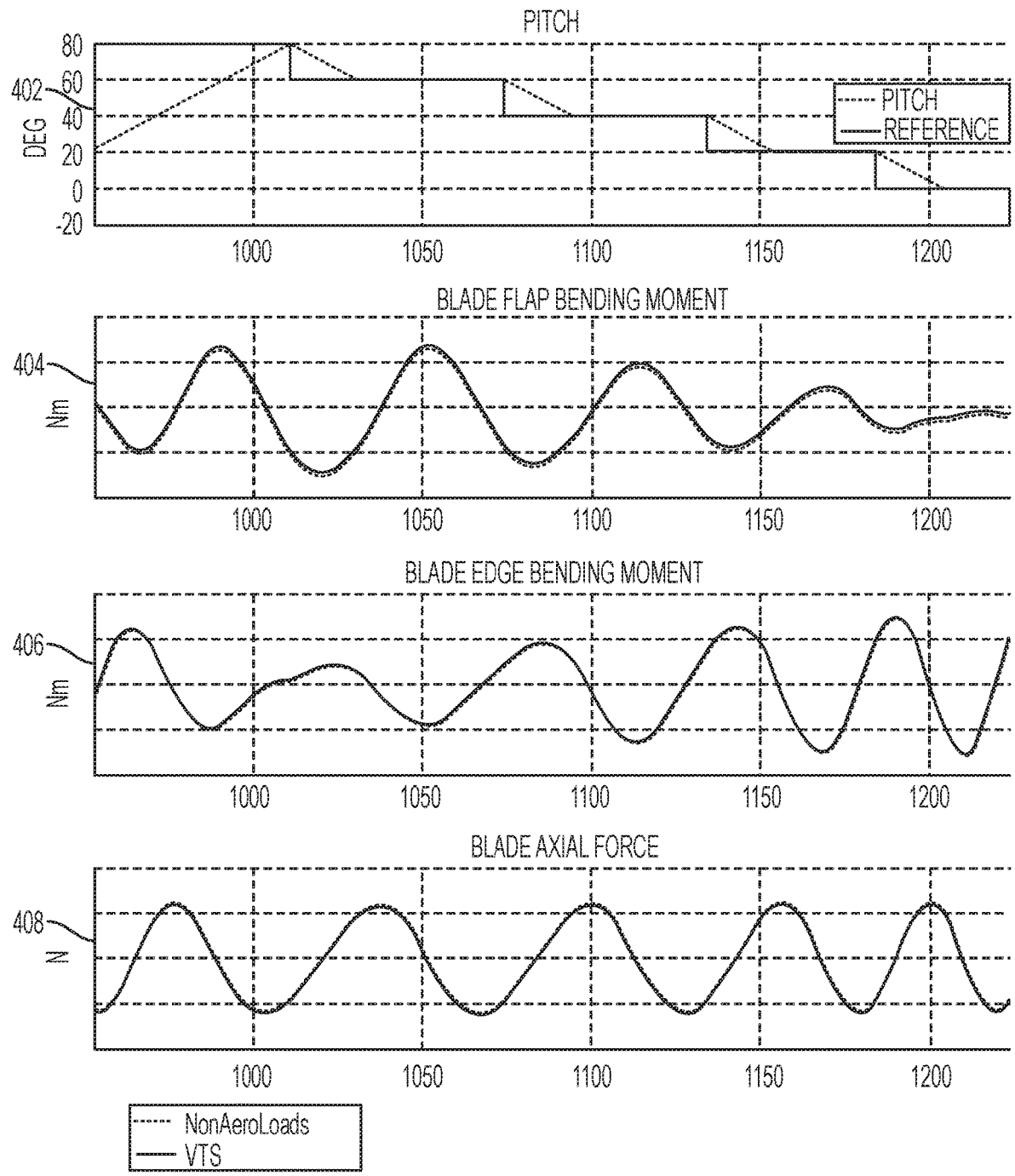

FIG. 4 shows an example trajectory for the relevant loads as functions of the descending staircase in pitch reference, as the blade is pitched up to 80 degrees, and then down to 0 degrees. The graphs respectively show the pitch angle (402), the blade flap bending moment (404), the blade edge bending moment (406) and the blade axial force (408). The flap and edge loads and axial force are all influenced by the rotor azimuth angle—the generally sinusoidal shapes of the graphs follow the rotation of the rotor, as gravity acts on the blade. It can be seen that the blade axial force amplitude is generally constant (408) throughout the pitch sweep. However, the decreasing pitch causes the flap loads to decrease and the edge loads to increase, as would be expected.

Note that, alternatively the fitting problem can be cast as function of the blade position within the rotor, removing thereby the dependency from time.

The actual fitting of the parameters can be done by solving a least square problem (LS) in which the calibration parameters are adjusted until the curve fit error is minimized. This method operates on all the measured sensor and estimated loads data collected during the blade pitching. An iterative approach can also be used (LSiter) in which case the least squares method is used on sections of the data and then combined to achieve a minimum error fit.

An alternative implementation is with a Kalman filter, either online or offline using the collected data. The advantage of the online approach is that there is no need to store/collect data in memory, which is limited on many computers; the calibration parameters are adjusted in real-time during the blade pitching until convergence is reached. In the offline approach, the collected data is passed into the Kalman filter just as in the online approach, but with the advantage of being able to use a smoother or backwards pass.

Figure 5:
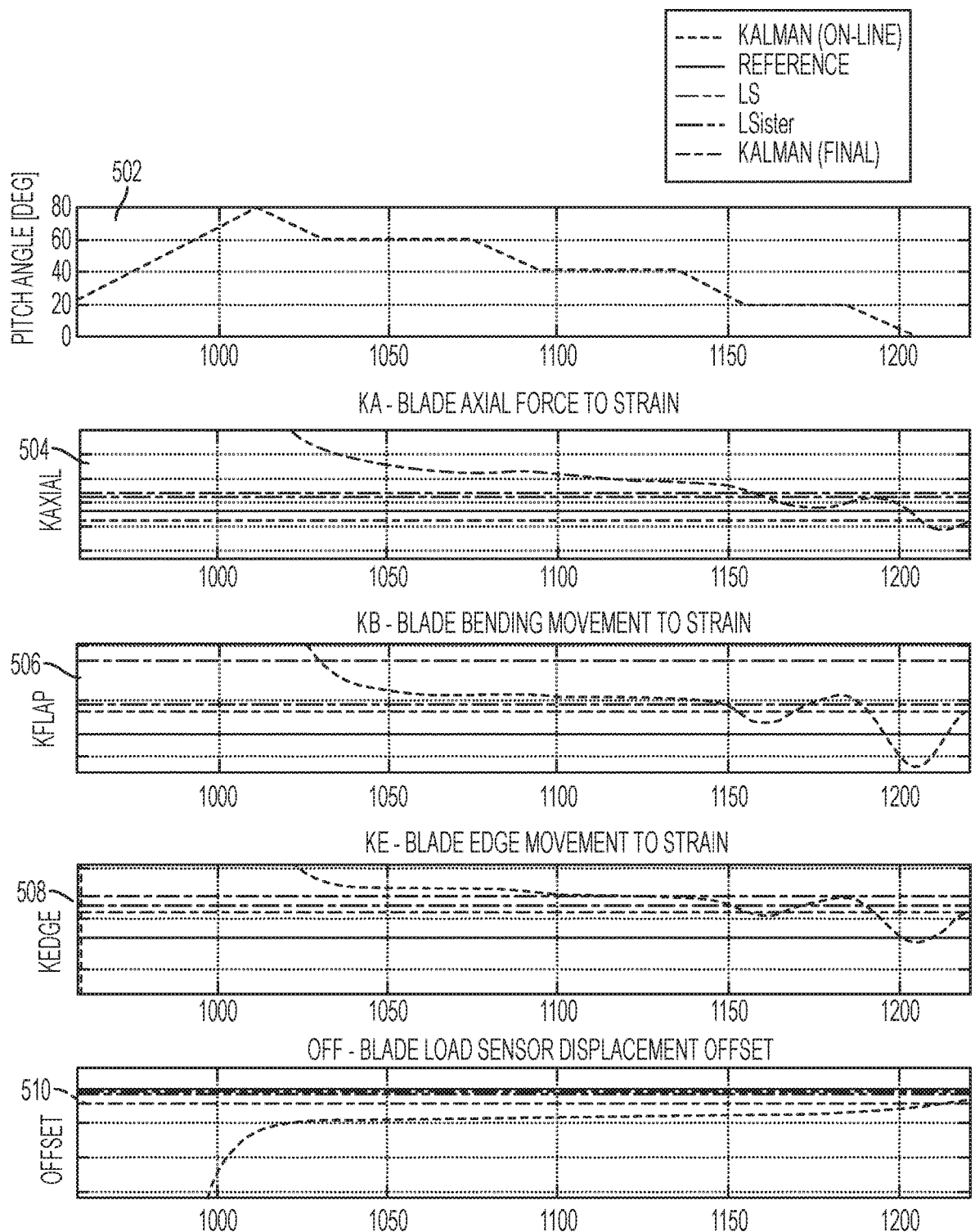

FIG. 5 shows an example of calibration output for the different methodologies discussed. It can be seen how an online calibration algorithm (Kalman online, the wandering line as opposed to the other straight lines) would converge towards the true values while an offline counterpart (LS, LSiter) will output a value based on the whole data collection. The calibration values are compared to the "true" values (solid line). The graphs in FIG. 5 show the blade pitch angle (502), Ka (504—blade axial force to strain), Kb (506—blade bending moment to strain), Ke (508—blade edge moment to strain) and Off (510—blade load sensor displacement offset).

It will be appreciated by those skilled in the art that the invention has been described by way of example only, and that a variety of alternative approaches may be adopted without departing from the scope of the invention, as defined by the appended claims.

The invention claimed is:

1. A method of calibrating load sensors of a wind turbine, the wind turbine comprising a rotor, a plurality of rotor blades, and a plurality of load sensors associated with the plurality of rotor blades, the method comprising:
while the rotor is rotating:
prior to moving at least one rotor blade of the plurality of rotor blades through a series of calibration positions, moving all of the plurality of rotor blades to control a rotational speed of the rotor;
moving the at least one rotor blade through the series of calibration positions by altering a pitch angle of the at least one rotor blade to differ from a pitch angle of at least one other rotor blade of the plurality of rotor blades, wherein the series of calibration positions comprises a first calibration position and a second calibration position, wherein the number of the at least one rotor blade is less than the number of the plurality of rotor blades; and
moving, while moving the at least one rotor blade through the series of calibration positions, the at least one other rotor blade to a control position selected to control the rotational speed of the rotor; and
measuring, at each calibration position of the series, load values from the plurality of load sensors.

2. The method of claim 1, wherein moving the at least one rotor blade through the series of calibration positions occurs during idling of the wind turbine.

3. The method of claim 1, wherein the first calibration position is a maximum calibration position for the at least one rotor blade, wherein the second calibration position is a minimum calibration position for the at least one rotor blade, and wherein moving the at least one rotor blade through the series comprises moving the at least one rotor blade continuously between the maximum and minimum calibration positions.

4. The method of claim 1, wherein the at least one rotor blade has at least a first load sensor of the plurality of load sensors, the method further comprising:
using a first load value from the first load sensor to determine axial, flap moment, and edge moment components of the load.

5. The method of claim 1, wherein the series of calibration positions further comprises at least one intermediate calibration position between the first calibration position and the second calibration position.

6. A method of calibrating load sensors of a wind turbine, the wind turbine comprising a rotor, a plurality of rotor blades, and a plurality of load sensors comprising at least one load sensor associated with each rotor blade of the plurality of rotor blades, the method comprising:
while the rotor is rotating:
moving at least a first rotor blade of the plurality of rotor blades through a series of calibration positions by altering a pitch angle of the first rotor blade to differ from a pitch angle of at least a second rotor blade of the plurality of rotor blades, wherein the series of calibration positions comprises a first calibration position and a second calibration position; and
moving, while moving at least the first rotor blade through the series of calibration positions, at least a second rotor blade of the plurality of rotor blades to a control position selected to control a rotational speed of the rotor; and
measuring, at each calibration position of the series, load values from the plurality of load sensors; and
for the at least one load sensor associated with the first rotor blade, using the measured load values to determine axial, flap moment, and edge moment components of the load.

7. The method of claim 6, further comprising:
prior to moving at least the first rotor blade through the series of calibration positions, moving all of the plurality of rotor blades to control the rotational speed.

8. The method of claim 6, wherein moving at least the first rotor blade through the series of calibration positions occurs during idling of the wind turbine.

9. The method of claim 6, wherein the first calibration position is a maximum calibration position for at least the first rotor blade, wherein the second calibration position is a minimum calibration position for at least the first rotor blade, and wherein moving at least the first rotor blade through the series comprises moving at least the first rotor blade continuously between the maximum and minimum calibration positions.

10. A wind turbine comprising:
a rotor;
a plurality of rotor blades;
a plurality of load sensors associated with the plurality of rotor blades; and
a controller configured to:
while the rotor is rotating:
alter a pitch angle of at least one rotor blade of the plurality of rotor blades, relative to at least one other rotor blade of the plurality of rotor blades, to move the at least one rotor blade through a series of calibration positions comprising a first calibration position and a second calibration position, wherein the number of the at least one rotor blade is less than the number of the plurality of rotor blades; and
moving, while moving the at least one rotor blade through the series of calibration positions, at least one other rotor blade of the plurality of rotor blades to a control position selected to control a rotational speed of the rotor; and
measure, at each calibration position of the series, load values from the plurality of load sensors.

11. The wind turbine of claim 10, wherein the controller is further configured to:
prior to moving the at least one rotor blade through the series of calibration positions, moving all of the plurality of rotor blades to control the rotational speed.

12. The wind turbine of claim 10, wherein moving the at least one rotor blade through the series of calibration positions occurs during idling of the wind turbine.

13. The wind turbine of claim 10, wherein the first calibration position is a maximum calibration position for the at least one rotor blade, wherein the second calibration position is a minimum calibration position for the at least one rotor blade, and wherein moving the at least one rotor blade through the series comprises moving the at least one rotor blade continuously between the maximum and minimum calibration positions.

14. A non-transitory computer readable medium containing a program which, when executed by one or more computer processors, performs an operation of calibrating load sensors of a wind turbine, the wind turbine comprising a rotor, a plurality of rotor blades mounted to the rotor, and a plurality of load sensors associated with the plurality of rotor blades; the operation comprising:
  during rotation of the rotor:
    altering a pitch angle of at least one rotor blade of the plurality of rotor blades, relative to at least one other rotor blade of the plurality of rotor blades, to move the at least one rotor blade through a series of calibration positions comprising a first calibration position and a second calibration position, wherein the number of the at least one rotor blade is less than the number of the plurality of rotor blades; and
    moving, while moving the at least one rotor blade through the series of calibration positions, at least one other rotor blade of the plurality of rotor blades to a control position selected to control a rotational speed of the rotor; and
    measuring, at each calibration position of the series, load values from the plurality of load sensors.

15. The computer readable medium of claim 14, wherein the rotation of the rotor occurs during idling of the wind turbine.

16. The computer readable medium of claim 14, wherein the first calibration position is a maximum calibration position for the at least one rotor blade, wherein the second calibration position is a minimum calibration position for the at least one rotor blade, and wherein moving the at least one rotor blade through the series comprises moving the at least one rotor blade continuously between the maximum and minimum calibration positions.

17. The computer readable medium of claim 14, the operation further comprising:
  prior to moving the at least one rotor blade through the series of calibration positions, moving all of the plurality of rotor blades to control the rotational speed.

18. The computer readable medium of claim 14, wherein the operation further comprises:
  prior to moving the at least one rotor blade through the series of calibration positions, moving all of the plurality of rotor blades to control the rotational speed.

19. The computer readable medium of claim 14, wherein moving the at least one rotor blade through the series of calibration positions occurs during idling of the wind turbine.

20. The computer readable medium of claim 14, wherein the first calibration position is a maximum calibration position for the at least one rotor blade, wherein the second calibration position is a minimum calibration position for the at least one rotor blade, and wherein moving the at least one rotor blade through the series comprises moving the at least one rotor blade continuously between the maximum and minimum calibration positions.

* * * * *